(12) United States Patent
Morrissey et al.

(10) Patent No.: US 11,648,632 B1
(45) Date of Patent: May 16, 2023

(54) TREATMENT PROCESS FOR A CENTRIFUGAL COMPRESSOR WHEEL TO EXTEND LOW-CYCLE FATIGUE LIFE

(71) Applicant: Garrett Transportation I Inc., Torrance, CA (US)

(72) Inventors: Michael Morrissey, Waterford (IE); Franklin Allen, Torrance, CA (US); Xiaodong Li, Shanghai (CN); Quentin Roberts, Chantraine (FR); Philippe Renaud, Sanchey (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/455,925

(22) Filed: Nov. 22, 2021

(51) Int. Cl.
| | |
|---|---|
| B23P 15/00 | (2006.01) |
| C22F 1/04 | (2006.01) |
| B21D 31/04 | (2006.01) |
| F04D 29/28 | (2006.01) |

(52) U.S. Cl.
CPC ............ B23P 15/006 (2013.01); B21D 31/04 (2013.01); C22F 1/04 (2013.01); F04D 29/284 (2013.01)

(58) Field of Classification Search
CPC .............................. B23P 15/006; F04D 29/284
See application file for complete search history.

(56) References Cited

U.S. PATENT DOCUMENTS

| | | | |
|---|---|---|---|
| 4,885,829 A | 12/1989 | Landy | |
| 6,164,931 A | 12/2000 | Norton et al. | |
| 6,994,526 B2 | 2/2006 | Furman et al. | |
| 7,464,577 B2 | 12/2008 | Habedank et al. | |
| 8,641,380 B2 | 2/2014 | McKenzie | |
| 9,534,499 B2 | 1/2017 | Cornell et al. | |
| 10,370,972 B2 | 8/2019 | Rhodes et al. | |
| 2003/0136001 A1 | 7/2003 | Nishiyama et al. | |
| 2013/0260168 A1 | 10/2013 | Slavik et al. | |
| 2018/0281134 A1 | 10/2018 | Hagan et al. | |
| 2020/0116032 A1* | 4/2020 | Arai | ........................ F01D 5/288 |
| 2020/0400158 A1* | 12/2020 | Mavrosakis | .......... F04D 29/023 |

OTHER PUBLICATIONS

SAE Manual on Shot Peening, publication date unknown.

* cited by examiner

*Primary Examiner* — Jason L Vaughan
*Assistant Examiner* — Amanda Kreiling
(74) *Attorney, Agent, or Firm* — John C. James

(57) ABSTRACT

A process for treating a centrifugal compressor wheel includes a combination of cold expansion of at least part of the bore of the wheel to induce residual compressive stresses in a region around the bore, and surface peening at least parts of the compressor wheel such as the back disk and portions of the blades.

12 Claims, 11 Drawing Sheets

TREATMENT PROCESS FOR A CENTRIFUGAL COMPRESSOR WHEEL TO EXTEND LOW-CYCLE FATIGUE LIFE

BACKGROUND OF THE INVENTION

This application relates generally to centrifugal compressor wheels, such as for use in turbochargers for internal combustion engines.

Typically, the life-limiting mode of a centrifugal compressor wheel is a low-cycle fatigue (LCF) failure mode. Various failure modes can occur. In one LCF failure mode, one or more cracks can initiate at or near the surface of the through bore of the wheel. In other modes, the back disk of the wheel can form cracks in either a chordal configuration or a "pizza cut" configuration.

SUMMARY OF THE DISCLOSURE

An objective of the present technical developments, which led to the invention herein described, is to improve the LCF life of a centrifugal compressor wheel.

The present disclosure describes a treatment process for a centrifugal compressor wheel that is capable of significantly extending the LCF life of the wheel. The process entails the sequential application of two operations on the wheel. In one operation, the inner surface of at least part of the length of the bore is cold worked by forced expansion of the bore diameter, thereby creating a zone of compressive residual hoop stresses in the metal surrounding the bore. In the second operation, surface peening is performed on at least a portion of the compressor wheel to induce compressive residual stresses in surfaces of the wheel. Advantageously, bore cold working achieves at least 1.2% retained expansion, and surface peening is performed at an intensity of 0.15 mm to 0.6 mm as measured on the Almen N scale.

In one embodiment described herein, a treatment process comprises the steps of:
providing a centrifugal compressor wheel fabricated of a ductile metal having a tensile yield strength, the compressor wheel comprising a hub and a back disk, and a plurality of blades joined to the hub and the back disk, the plurality of blades defining an inducer portion of the compressor wheel configured for axial entrance of air into the compressor wheel and defining an exducer portion of the compressor wheel configured for radially outward discharge of air from the compressor wheel, each blade having a blade root fillet where the blade joins with the hub, the compressor wheel having a first face and an opposite second face, the hub of the compressor wheel defining a bore that extends centrally through the hub and the back disk along a downstream axial direction;
cold working the metal at an inner surface of the bore beyond the tensile yield strength in a hoop-wise direction about the bore, so as to induce compressive residual hoop stresses in the metal adjacent the inner surface of the bore; and
surface peening at least a portion of the compressor wheel, excluding the inner surface of the bore.

In some embodiments, the cold working step comprises applying radially outward pressure on the inner surface of the bore. This can be accomplished mechanically, such as by using a mechanical tool to apply the radially outward pressure on the inner surface of the bore. For example, the cold working step can comprise axially drawing the tool through the bore along the downstream axial direction, the tool having a diameter that exceeds an initial diameter of the bore before the cold working step. Various mechanical tools can be employed, non-limiting examples of which include a radially expandable mandrel (or "split mandrel") that can be triggered at the desired location along the bore, after which the expanded mandrel is then drawn axially along the bore to cold work the bore, or alternatively a split sleeve and mandrel, wherein the split sleeve is located in the bore and the mandrel is pulled through the sleeve to expand the sleeve radially outwardly and thereby cold work the bore. Ballizing is yet another technique that can be employed. Cold working can be applied to the full axial length of the bore, or alternatively can be applied to only a portion of the length. When only part of the bore length is to be cold worked, a larger-diameter counterbore can be provided in the region of the bore that is not to be cold worked, and the mechanical tool can initially start within the counterbore before being drawn through the main bore portion of smaller diameter.

As alternatives to the use of mechanical tools, cold working of the bore can be accomplished by non-mechanical means (non-limiting examples of which can include laser treatment of the inner bore surface, or chemical treatment of the inner bore surface).

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
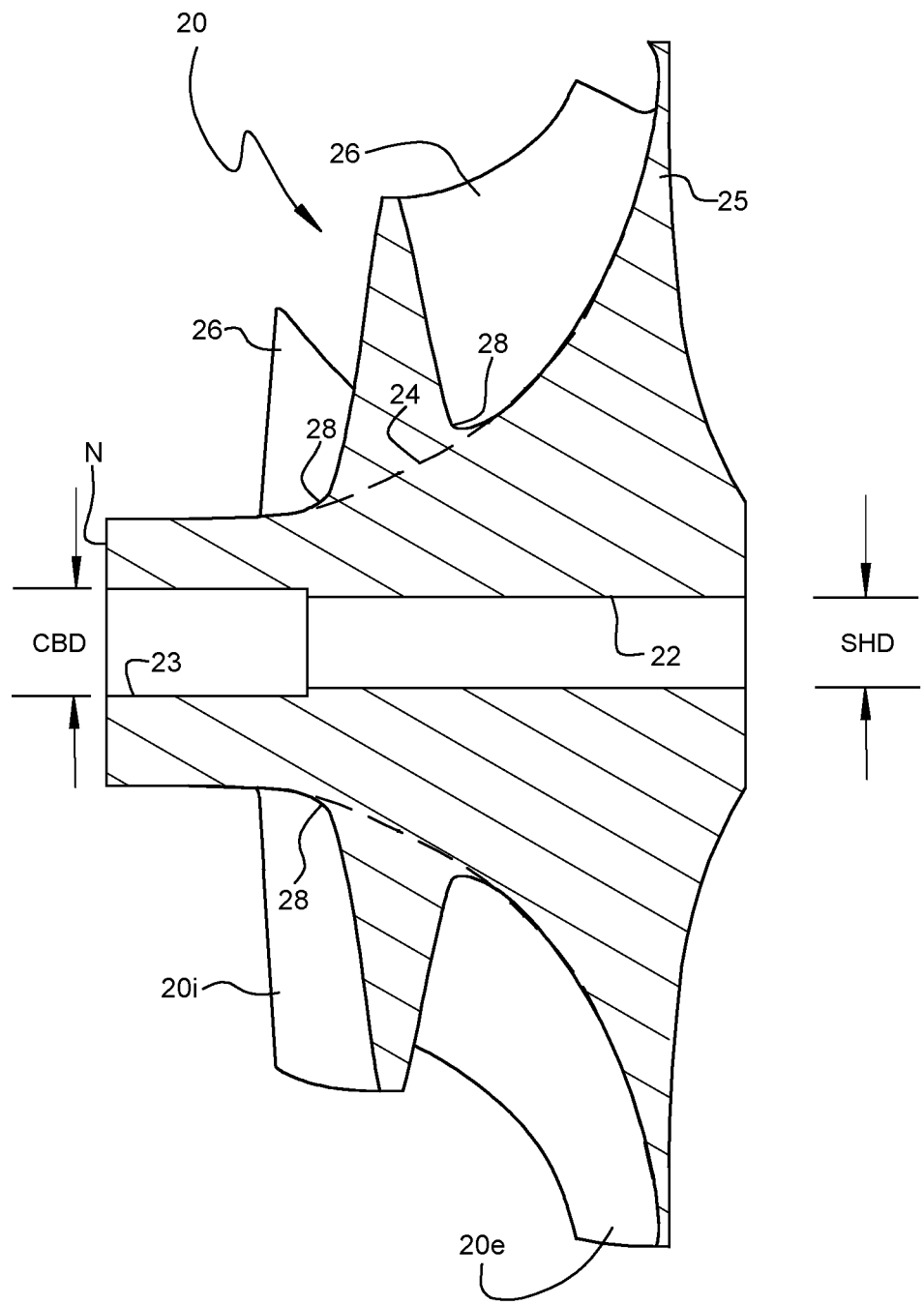
FIG. 1 is a cross-sectional view through a compressor wheel prior to a treatment process in accordance with embodiments of the invention.
Figure 2:
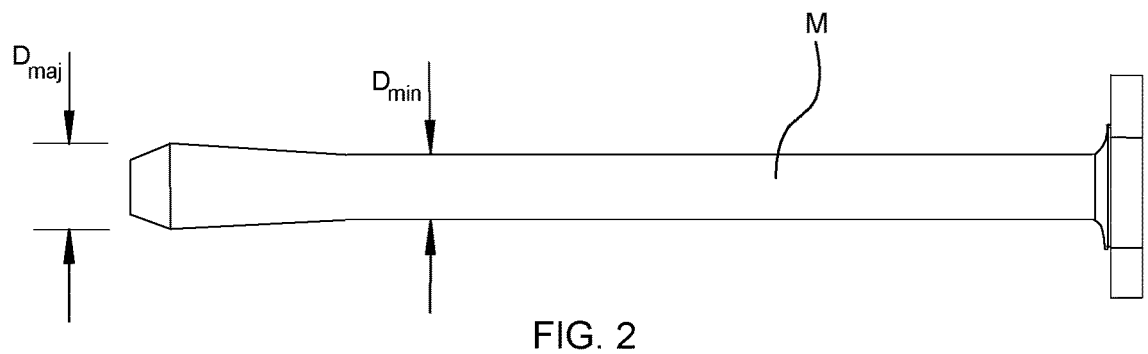
FIG. 2 is a side view of a mandrel usable in executing the cold expansion of the bore in accordance with a treatment process of the invention.

FIG. 1 illustrates a compressor wheel 20 to which a treatment process in accordance with the invention may be applied. The wheel is manufactured of a ductile metal such as aluminum alloy (suitable examples of which include grades 354, 355, or 2618), by a casting process or by machining from a billet. A cylindrical bore or "starting hole" 22 having a starting hole diameter SHD is then drilled through the center of the wheel. A counterbore 23 having a counterbore diameter CBD larger than the starting hole diameter is formed at the end of the starting hole adjacent the nose N of the wheel.

The wheel comprises a hub 24 and a back disk 25, and a plurality of blades 26 joined to the hub and to the back disk, the blades extending generally radially outwardly from the hub. Where the blades 26 join with the hub 24, there are blade root fillets 28 that effect a blended or smooth transition between the generally radially extending airfoil surfaces of the blades and the generally circumferentially extending outer surface of the hub. The blades define an inducer portion 20i of the compressor wheel configured for axial entrance of air into the compressor wheel and define an exducer portion 20e of the compressor wheel configured for radially outward discharge of air from the compressor wheel.

The shape of the hub 24 in a centrifugal compressor wheel is such that with increasing axial distance from the nose of the wheel (in the left-to-right direction in FIG. 1), the hub 24 increases in radius and hence the mass of the wheel per unit length increases toward the back disk 25 of the wheel. The relatively high mass per unit of axial length near the back disk 25 of the wheel induces a greater magnitude of cyclic tensile stresses in the bore 22 in that location, relative to the nose area of the wheel where the mass per unit length is smaller. The life-limiting mode of a centrifugal compressor wheel typically is one of two possible modes. The first common failure mode is a low-cycle fatigue (LCF) failure mode emanating from a crack that starts at or near the inner surface of the bore of the wheel, generally somewhere in the lengthwise portion of the bore where the mass concentration is relatively high. The second common failure mode is due to one or more cracks that initiate in the back disk in a chordal or pizza-cut configuration. The present invention aims to mitigate the LCF stresses in a centrifugal compressor wheel so as to extend the LCF life of the wheel.

Described herein are embodiments of a treatment process for a centrifugal compressor wheel capable of substantially extending the LCF life of the wheel. The treatment process entails two operations that induce residual compressive stresses in the wheel. In a first operation, cold expansion of the bore to stress the material beyond its elastic yield strength induces residual compressive hoop stresses in the material of the wheel in a zone extending from the inner surface of the bore radially outwardly for a radial extent that depends on various factors such as the amount of plastic deformation induced, the dimensions of the bore, the material properties, etc. In a second operation, at least some surfaces of the wheel are surface peened to induce residual compressive stresses in the surfaces.

FIGS. 2 through 5 illustrate an exemplary tool for cold expansion of the bore of the wheel. The tool comprises an assembly of a tapered mandrel M, a split sleeve SS, and a nose cap NC. The tapered mandrel is constructed of high-strength metal such as tool steel, and comprises a rod-shaped member having a minor diameter $D_{min}$ along most of its length and having a tapered section that increases in diameter toward the distal end of the mandrel up to a major diameter $D_{maj}$, which is the maximum diameter of the rod portion. The proximal end of the mandrel defines an enlarged head configured to be engaged by a hydraulic cylinder assembly for imparting axial movement to the mandrel.

Figure 3:
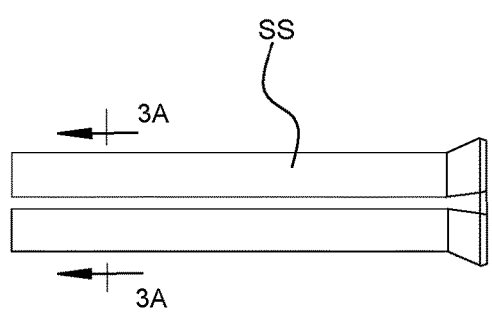
FIG. 3 is a side view of a split sleeve usable with the mandrel of FIG. 2 for executing the cold-expansion of the bore.
Figure 3A:
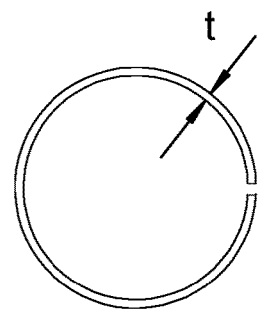
FIG. 3A is a cross-sectional view through line 3A-3A of FIG. 3.
Figure 4:
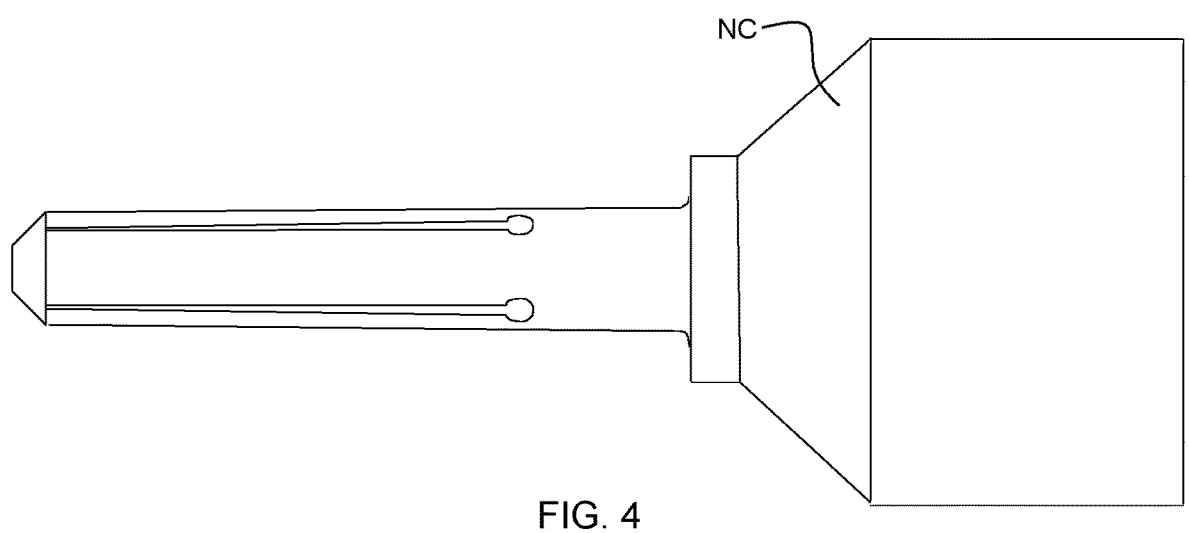
FIG. 4 is a side view of a nose cap usable with the mandrel and split sleeve of FIGS. 2 and 3, respectively, for executing the bore cold expansion step of the treatment process in accordance with embodiments of the invention.
Figure 5:
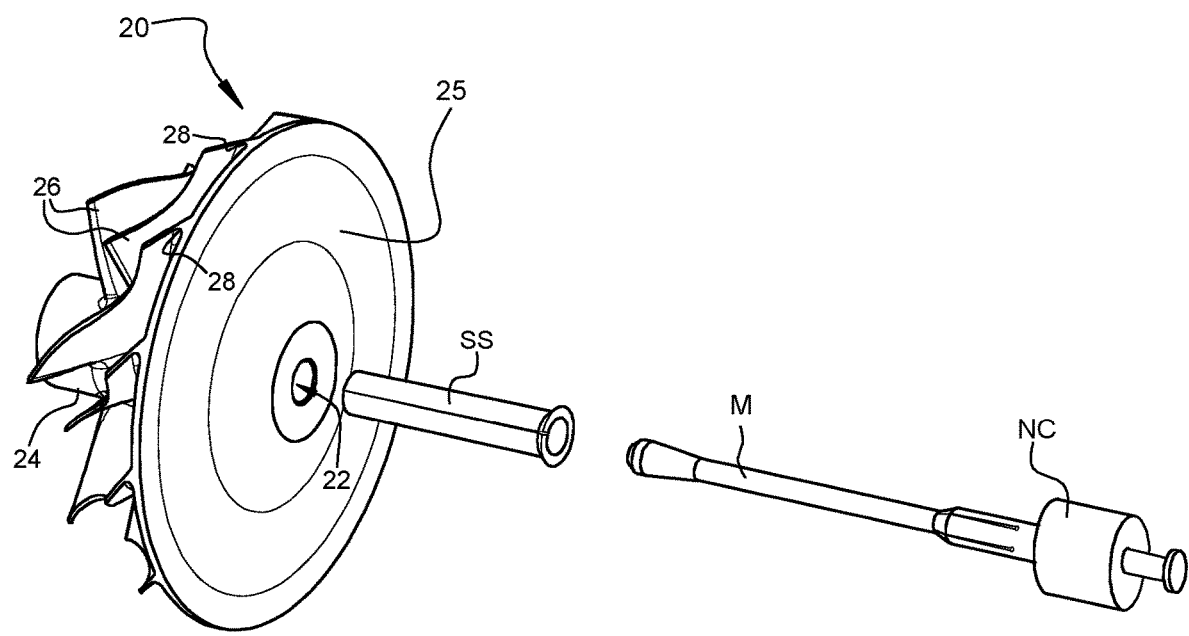
FIG. 5 is an exploded view of a compressor wheel and a mechanical tool comprising a mandrel, split sleeve, and nose cap, for cold expansion of the bore of the wheel.

The split sleeve SS is a cylindrical tube of high-strength metal such as tool steel, having an axially extending slit along its full length. The wall thickness of the split sleeve is t (FIG. 3A). The proximal end of the split sleeve defines a flared section for purposes to be described below. The relaxed outside diameter and the wall thickness of the split sleeve are specifically sized in relation to the inside diameter of the starting hole in the compressor wheel to be treated. In turn, the minor and major diameters of the mandrel are specifically sized in relation to the dimensions of the split sleeve to be employed.

The nose cap NC is a conical member that attaches to the hydraulic cylinder assembly and centers the mandrel while providing a reference surface to locate the split-sleeve on the mandrel. A hole extends through the nose cap for passage of the rod portion of the mandrel.

Figure 6:
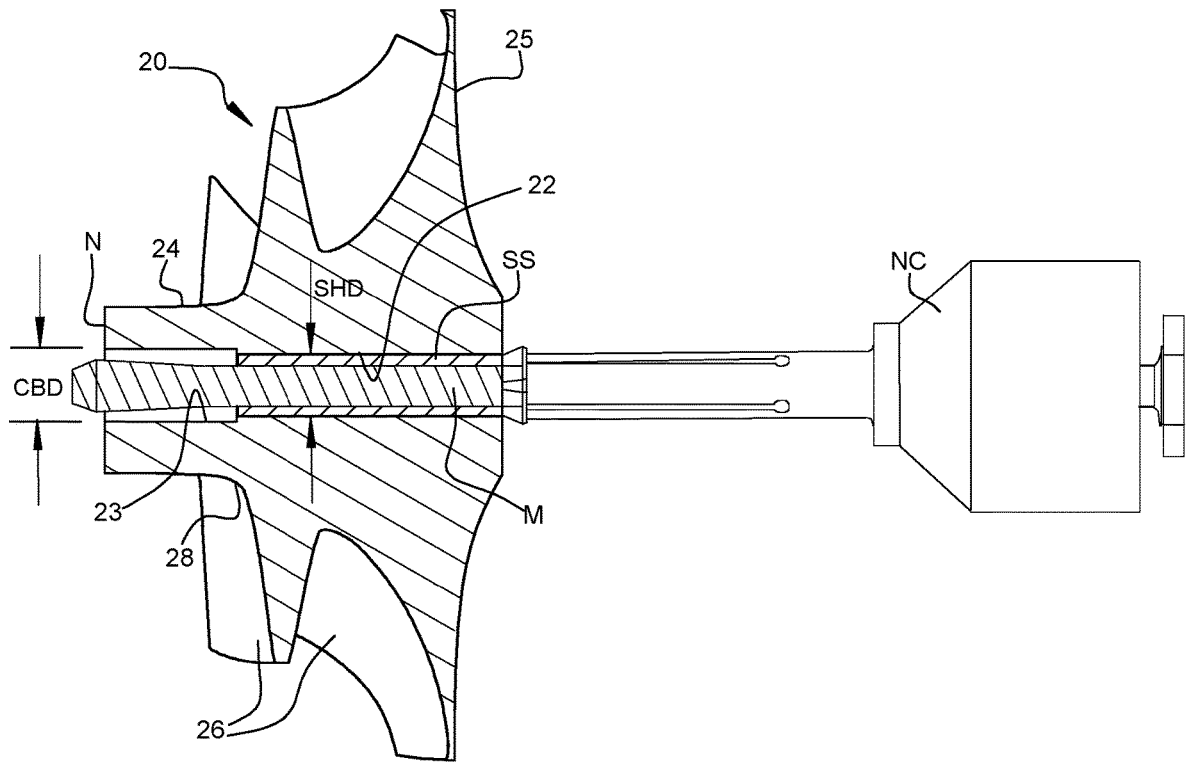
FIG. 6 is a cross-sectional view through a compressor wheel after the split sleeve and mandrel have been inserted into the bore of the wheel, showing the major diameter of the mandrel located within the counterbore prior to pulling the mandrel through the bore to cold expand it.

With reference to FIG. 6, the wheel is shown with the tool installed within the bore 22 but prior to the initiation of the cold expansion process. The split sleeve SS in this example extends only partway along the bore or starting hole 22, terminating at a point that is axially spaced downstream of the nose N of the wheel. The split sleeve is internally lubricated to facilitate free movement of the mandrel M within the sleeve. The flared section of the split sleeve provides a surface for engagement with a reference surface defined by the nose cap, and centers the split sleeve in the starting hole. Before the beginning of the cold expansion process, the major diameter of the mandrel is located within the counterbore 23. To cold expand the starting hole 22, the mandrel is drawn axially through the split sleeve by way of a hydraulic cylinder assembly (not shown), toward the right in FIG. 6. As the tapered portion of the mandrel begins to enter the inside of the split sleeve, the wall of the split sleeve is expanded radially outwardly, which in turn expands the inside diameter of the bore. This causes the ductile metal of the wheel to yield past its elastic tensile yield strength in the hoop-wise direction. This plastic yielding occurs over a zone surrounding the bore. The zone of plastic yielding occupies substantially only the portion of the bore 22 in which the split sleeve is disposed. Thus, the portion of the bore 22 to the left of the split sleeve SS in FIG. 6 is not cold worked and does not have a zone of plastic yielding.

The total radial expansion of the bore consists of an elastic component and a plastic component. Once the mandrel has exited from the bore, the elastic component will vanish and the bore will contract partway toward its original diameter, but a residual or retained expansion of the bore diameter will remain corresponding to the plastic component of the expansion. Thus, the expansion process can be characterized by an "applied expansion" and a "retained expansion" given by the following formulas:

$$\% \text{ Applied Expansion} = \frac{D_{maj} + 2t - SHD}{SHD} \times 100\%$$

$$\% \text{ Retained Expansion} = \frac{THD - SHD}{SHD} \times 100\%,$$

where $D_{maj}$ is the mandrel major diameter, t is the wall thickness of the split sleeve, SHD is the starting hole diameter in the wheel, and THD is the treated hole diameter after the cold expansion process.

Figure 7:
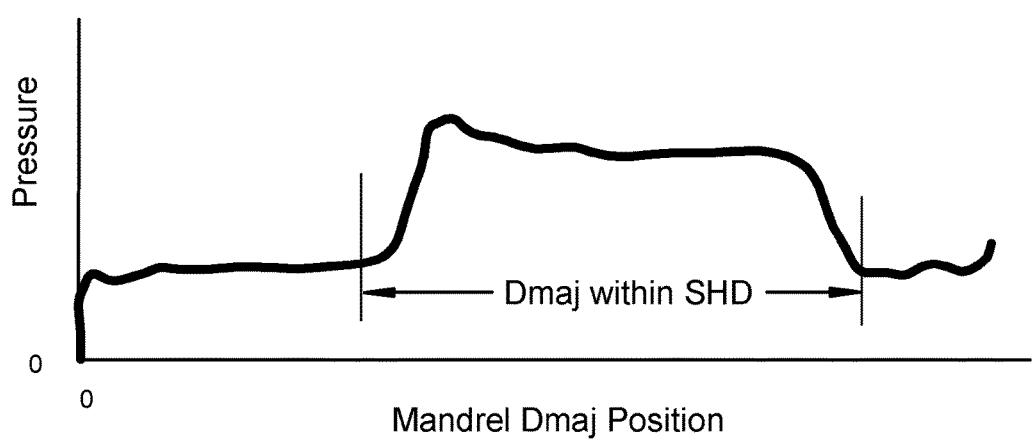
FIG. 7 is a representative example of a graph of pressure exerted by the split sleeve versus the axial position of the major diameter of the mandrel within the bore.

FIG. 7 is a representative plot of pressure exerted by the mandrel on the split sleeve, versus axial position of the major diameter of the mandrel as it travels from the nose to the back disk of the wheel. The relatively low-pressure plateau on the left of the plot represents the travel of the major diameter through the counterbore. As the tapered portion begins to move through the split sleeve, the pressure rapidly increases, reaching a peak pressure; the pressure then gradually diminishes as the major diameter passes through the sleeve and finally exits the sleeve. Through testing of a batch of compressor wheels having a range of SHD values, and measuring the % retained expansion and the peak pressure for each wheel, it is possible to derive a correlation between the % retained expansion and the peak pressure and derive an equation for the peak pressure as a function of % retained expansion. In this way, it is possible to set a minimum acceptable peak pressure limit for the process.

Figure 8:
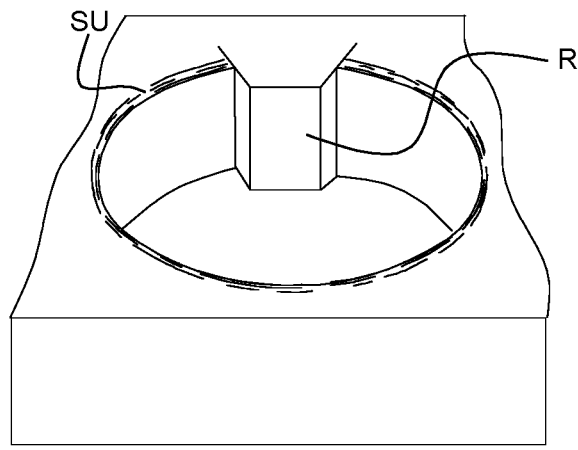
FIG. 8 is a diagrammatic depiction of two types of artifacts produced by split sleeve cold expansion of a bore, including an axially running ridge on the bore inner surface corresponding to the split in the sleeve, and an upset that occurs on the back face of the compressor wheel at the exit of the bore as a result of the cold expansion via the split sleeve.

The cold expansion of the bore typically results in the creation of artifacts, two types of which are diagrammatically depicted in FIG. 8. A first type of artifact is an axially running ridge R on the inner surface of the cold-expanded hole, corresponding to the location of the split in the split sleeve. A second type of artifact is a surface upset SU at the back face of the compressor wheel, comprising a thin annular region surrounding the exit of the hole and projecting slightly beyond the otherwise planar surface.

Figure 9:
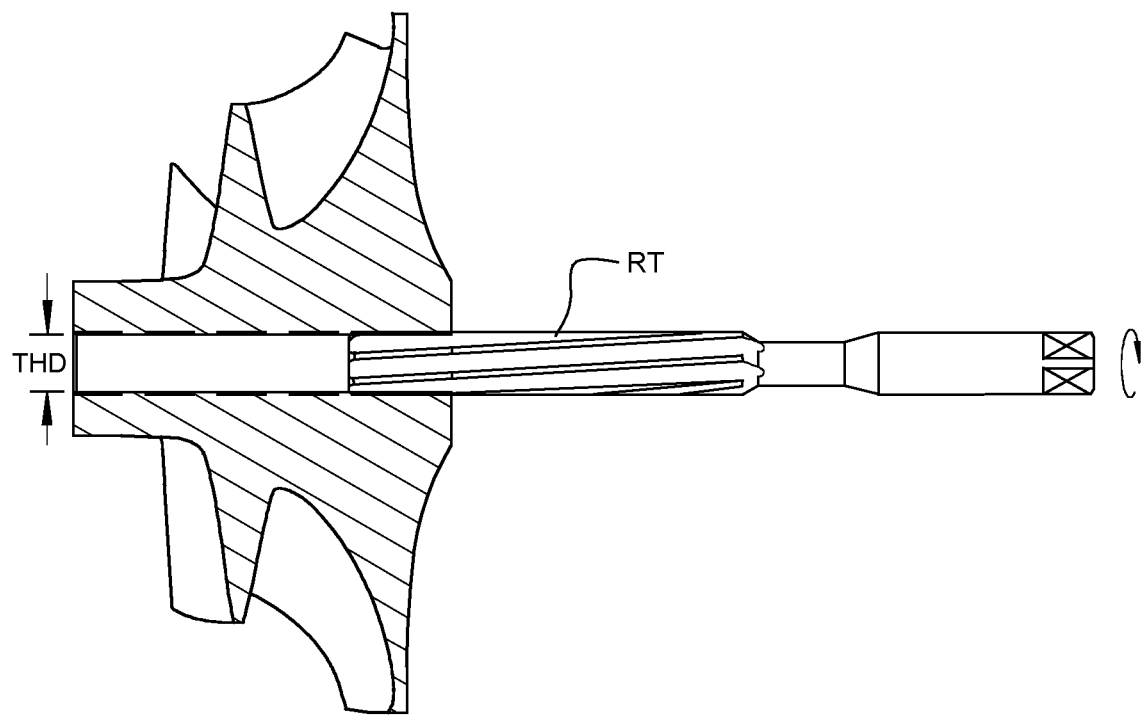
FIG. 9 is a side view, partly in section, showing a post-expansion reaming of the bore of the compressor wheel to remove any artifacts produced by the cold expansion step and conform the bore to the desired final inside diameter.
Figure 10:
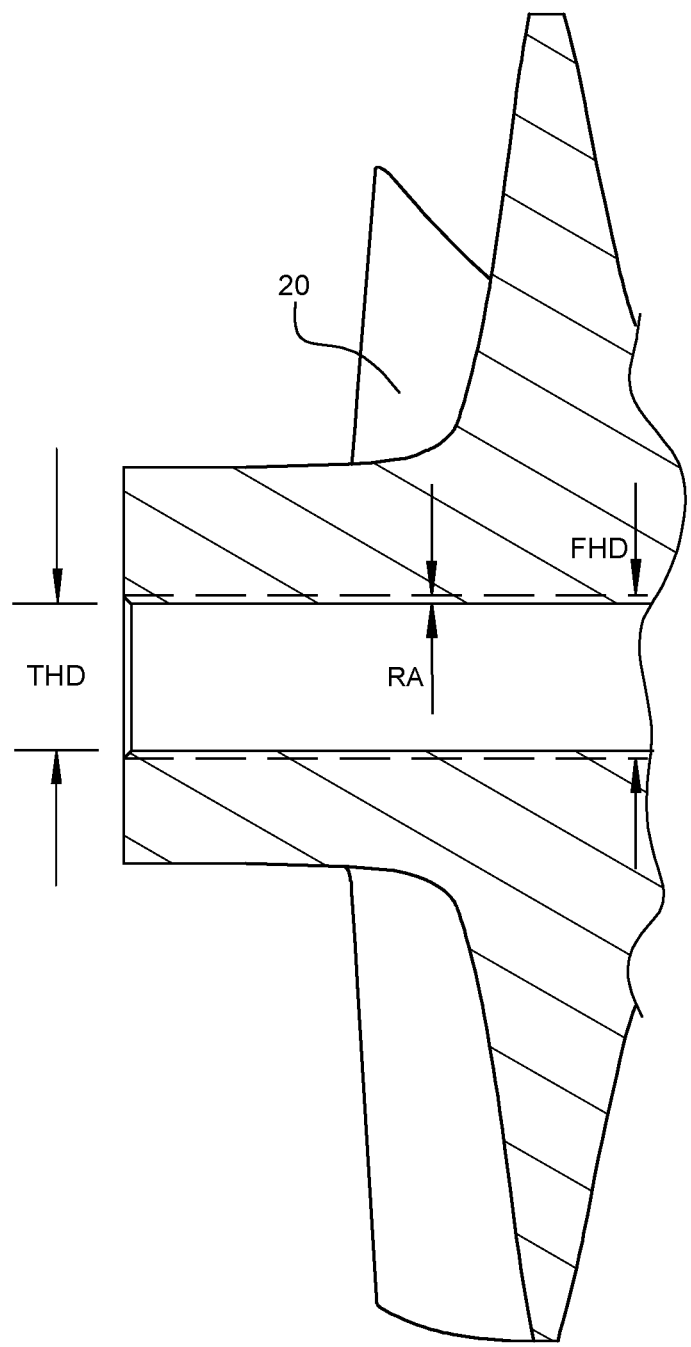
FIG. 10 is a magnified portion of FIG. 9 to show details of the post-expansion reaming step.

Advantageously, wheels processed in accordance with embodiments of the invention can undergo post-expansion operations to remove any such artifacts. Thus, as depicted for example in FIGS. 9 and 10, the axial ridge is removed by a reaming operation in which a reaming tool RT is used to ream the treated hole from a treated hole diameter THD to a slightly larger final hole diameter FHD. The reaming operation removes the "reaming allowance" RA, which is sufficiently large to remove the ridge artifact and assure uniformity of bore diameter and controlled surface finish along the bore length to aid in minimizing crack initiation. A second post-expansion operation is to skim the back face of the wheel to remove the surface upset SU. After the completion of the cold expansion and the post-expansion operations, the wheel is processed in a second operation of the treatment process in accordance with embodiments of the invention. The second operation comprises a surface-peening operation, as now described with reference to FIGS. 11-16.

Surface peening is a process for inducing residual compressive stresses in the surface of a treated part. Various types of surface-peening processes are known, including shot peening, ultrasonic peening, and laser peening. Selection of a suitable peening operation takes into account the depth to which residual stresses are imparted below the surface of the part, as well as the effect of the process on surface finish of the part. For present purposes, these considerations favor shot peening as a preferred approach because of the relatively large depth to which the compressive stresses can extend, and the relatively smooth surface finish that is created.

The shot peening process is carried out usually in a cabinet in order to confine the shot and facilitate its collection for reuse. The work to be peened is introduced into the shot stream typically by a mechanical means, which is so contrived as to expose the critical areas to the shot according to a predetermined program. The shot consists of hard particles which are classified as to size, and the usual sizes range from $\frac{1}{16}$ to $\frac{3}{32}$ inches in diameter. Various kinds and types of shot are available. Shot may be propelled by air or by a wheel, with velocities of the order of 200 feet per second. The area covered by the shot stream is called the "shot pattern". In the case of the pneumatic type of machine, shot is delivered from a nozzle and the shot pattern covers a circular area about two or three inches in diameter, depending on nozzle size and the distance to the work. Shot peening causes plastic flow in the surface of the part, stressing the material beyond its yield strength, which results in a residual compressive stress. The depth to which this compressive stress extends is dependent upon the properties of the material, the characteristics of the blast and the amount of shot striking the area being peened. The properties of the blast are defined by the velocity of the shot and its size and type. The amount of shot striking the area being peened is a function of the quantity of shot flowing, the shot pattern, relative movement between the part and the shot stream, and the time of exposure to the stream.

Shot peening of the compressor wheel advantageously is performed by an automated shot-peening machine as opposed to manually operated device, so that each shot-peening media stream is propelled at the wheel at a controlled rate, in a controlled direction, and for a controlled peening duration. The machine accordingly provides a means of moving, at a uniform speed, either the wheel through the media stream or the media stream over the wheel in either translation, rotation, or both, as required. The nozzles and the wheel should be held and moved mechanically. The wheel should not be subjected to any random movement during the process. The machine should be capable of consistently reproducing the required shot-peening intensities.

Shot-peening intensity and coverage are two important parameters of the process. Standard test procedures and materials have been developed for measuring the intensity of a shot-peening operation as well as the percentage of coverage. These test procedures involve the use of test strips of metal, made to specified standard length, width, and thickness dimensions, and are generally referred to as Almen test strips made from carbon steel SAE 1070. Almen test strips are available in "A", "C", and "N" types. Almen "N" strips are for relatively low-intensity peening applications, having a thickness of 0.76-0.81 mm and a hardness of about 72.5 HRa, and are the strips used for calibrating the shot-peening equipment in developing the present invention.

Standard test strip holders are available for Almen test strips, generally consisting of four steel balls fixedly mounted in a rectangular array on a heavy steel base, the balls providing point contact with the underside of a test strip at four locations near the four corners of the strip. Mounting screws clamp the test strip on top of the balls. When the top side of the test strip is exposed to a shot-peening stream, the resulting residual stresses at the top surface cause the strip to bow upwardly in an arc shape. The height of the arc correlates with the intensity of the shot peening; higher intensity causes a greater arc height, and lower intensity causes a smaller arc height. Time of exposure is also a factor in the arc height, with longer exposure time resulting in greater arc height. Thus, it is common to develop a plot of arc height versus exposure time by shot peening a series of identical test strips at various exposure times and measuring the arc height of each strip. The slope of the arc height versus time curve diminishes with increasing exposure time. A saturation point on the curve is defined as the point (at exposure time T) at which the arc height will increase by a further 10% by doubling the exposure time (2T). In other words, the saturation time is essentially the point of diminishing returns at which further exposure time yields little further arc height increase. Thus, the "intensity" of the shot peening is defined as the arc height at the saturation exposure time T.

Coverage of the shot peening is defined as the percentage of the surface that has been dented at least once by the peening media. Coverage is considered "full" when at least 98% of the surface is dented (per SAE International standard J2277, "Shot Peening Coverage Determination"). The peening time or duration for purposes of the present invention is the minimum time required to achieve 98% coverage of the surfaces being shot peened.

Selection of suitable shot media is also an important consideration for the present invention. For aluminum-alloy compressor wheels, glass bead media is preferred. Generally, for turbocharger compressor wheels of aluminum alloy, glass shot not smaller than 0.05 mm in diameter is suitable. The size of the shot should be such that the nominal shot diameter does not exceed half the smallest fillet radius to be peened.

In terms of the present invention, a compressor wheel, after having completed the cold-expansion operation and post-expansion finishing steps, is subjected to a shot-peening operation at a specified intensity selected to achieve the desired LCF life properties for the wheel. That selected intensity can be arrived at through empirical evaluations of a series of identical wheel specimens that are shot peened at various intensities and then subjected to stress cycles to determine an optimum intensity for LCF life. For purposes of the present invention, the shot-peening intensity advantageously is 0.15 mm to 0.60 mm (Almen N), as measured per standardized test procedure SAE International AMS2432 "Shot Peening, Computer Monitored". Preferably the intensity is from 0.2 mm to 0.4 mm, and more preferably from 0.25 mm to 0.35 mm.

Figure 11:
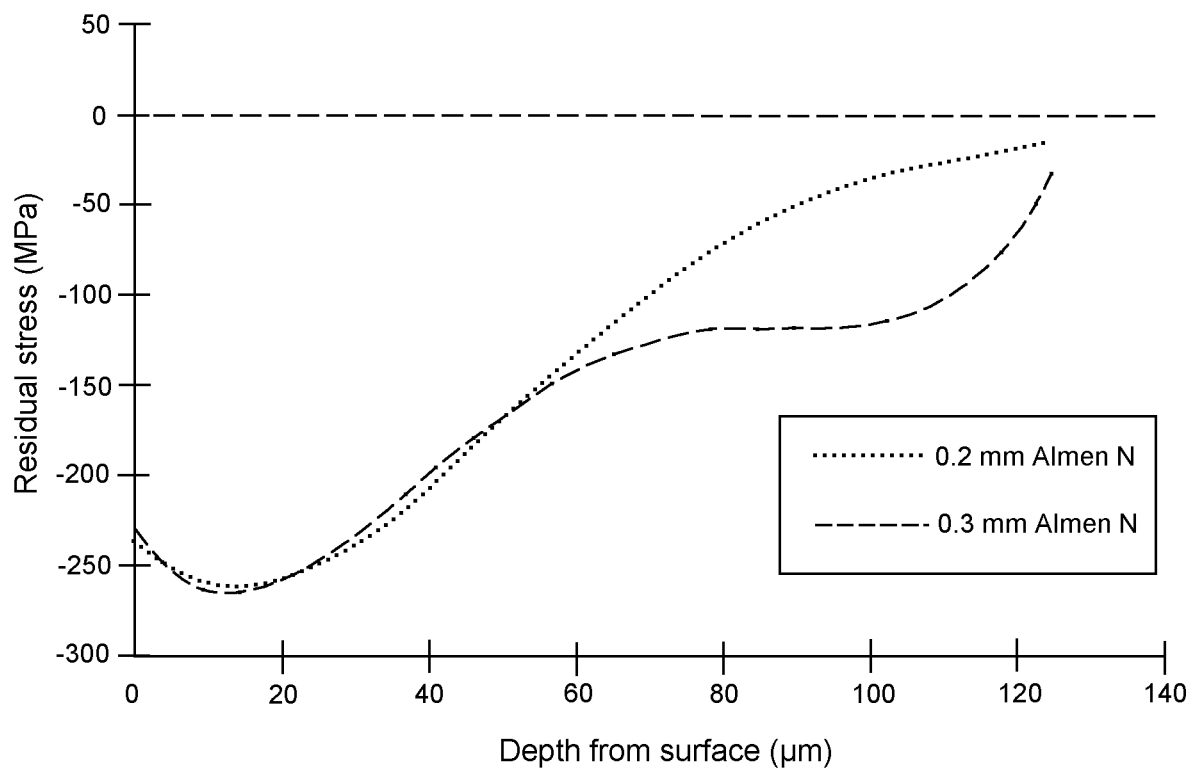
FIG. 11 is a representative plot of residual stress induced in the surface of two compressor wheels that have been shot peened at intensities of 0.2 mm and 0.3 mm, respectively, on the Almen N scale, showing the residual stress verses depth below the surface.

FIG. 11 is a plot that illustrates the effect of shot-peening intensity on residual stress at and below the surface of a compressor wheel. The residual stress is plotted versus depth below the surface, for 0.2 mm Almen N intensity and for 0.3 mm Almen N intensity. It can be seen that the peak residual compressive stress for both intensities is about 260 MPa, occurring about 13 µm below the surface. More generally, for the present invention, it is desirable for the peak residual stress from peening to be at least 200 MPa.

Figure 12:
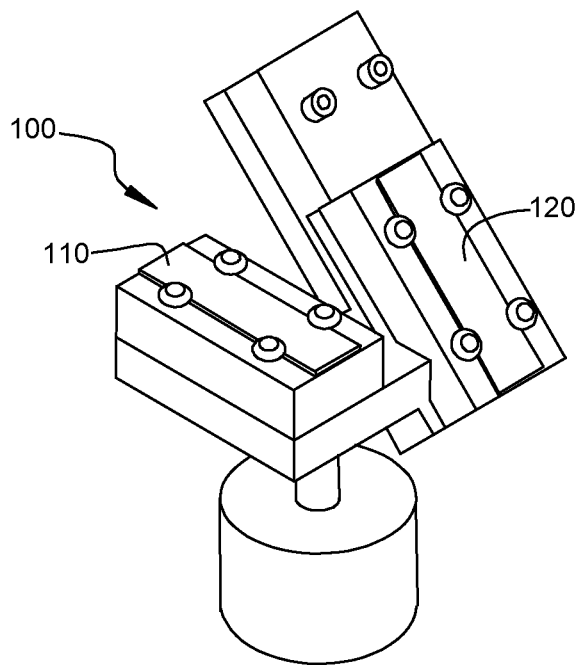
FIG. 12 is an Almen test strip holding fixture for use in calibrating a shot peening machine specifically configured for shot peening a compressor wheel in accordance with embodiments of the treatment process of the invention.
Figure 13:
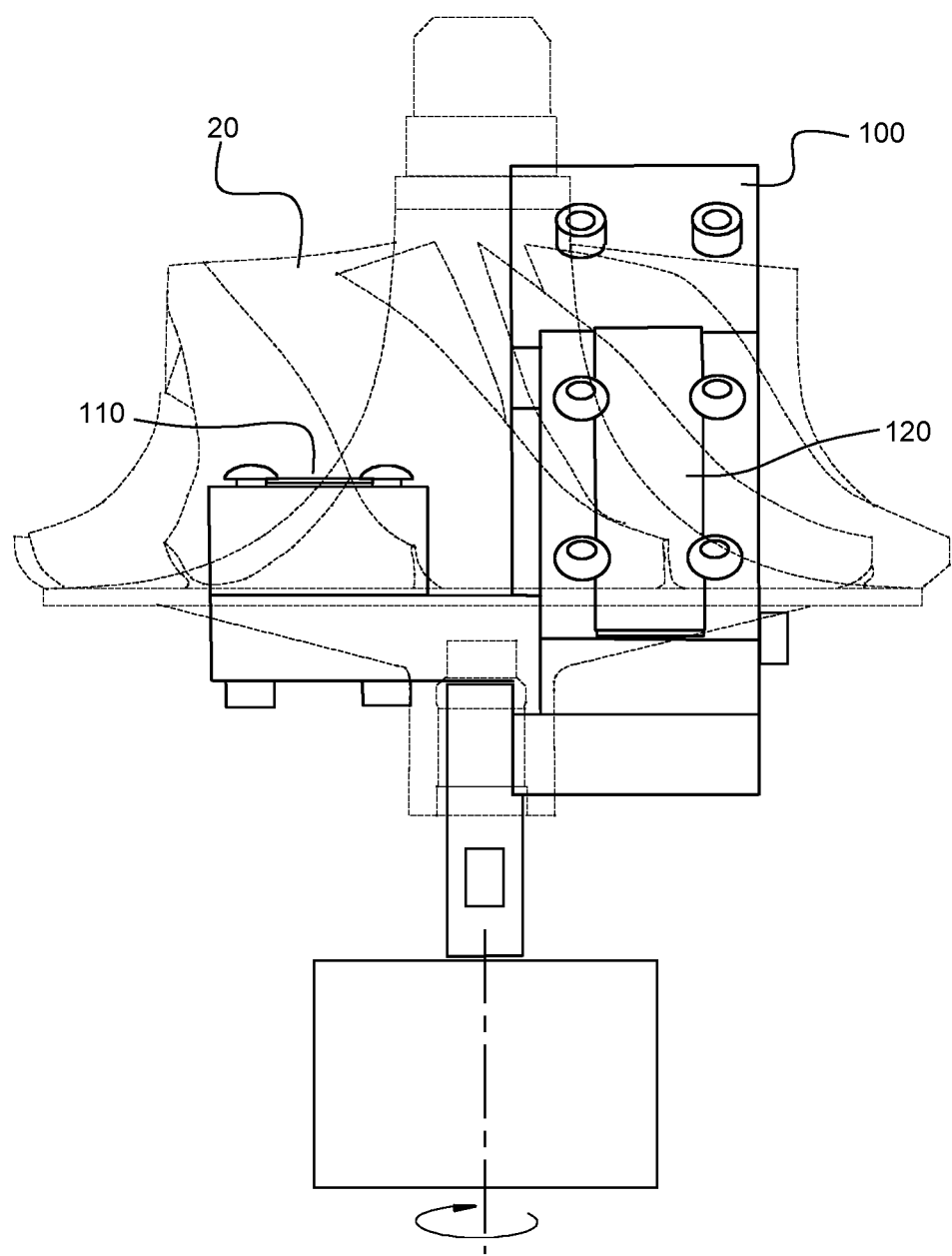
FIG. 13 illustrates how the Almen strip holding fixture is positioned to locate two test strips in locations approximately corresponding to surfaces of a compressor wheel to be shot peened.
Figure 14:
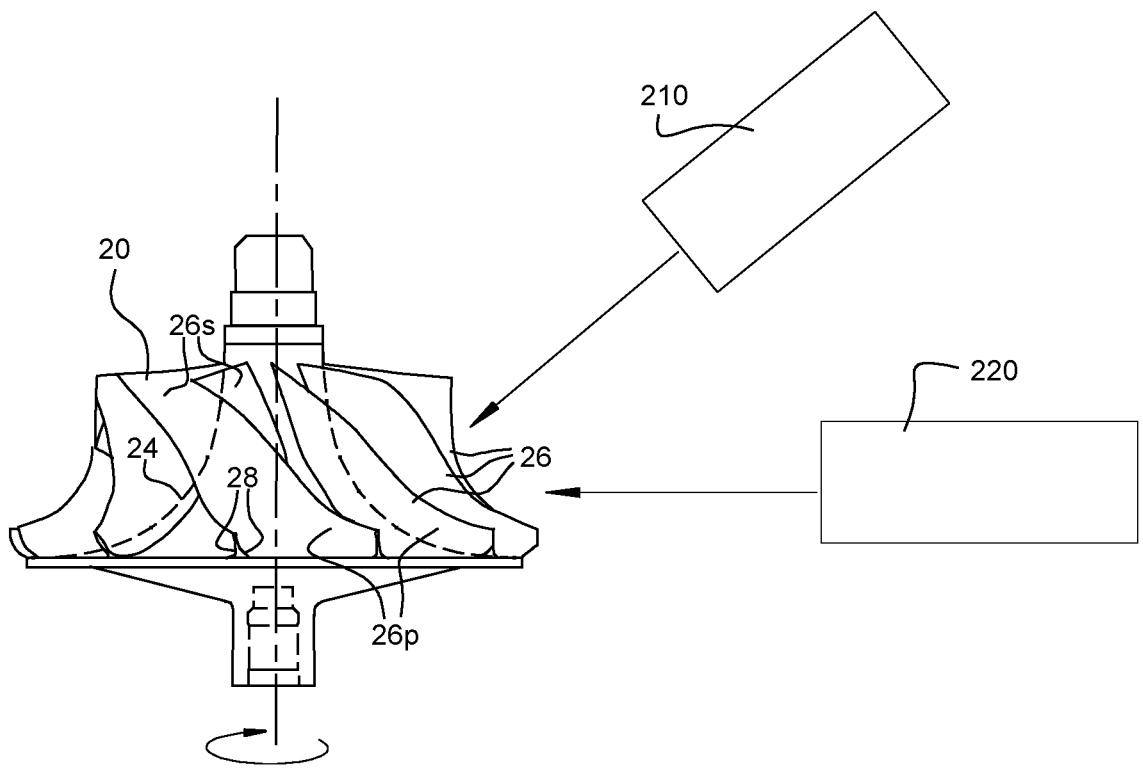
FIG. 14 is a diagrammatic side view of a shot peening machine having two nozzles for directing two streams of shot material at a compressor wheel as the wheel is rotated about its axis.
Figure 15:
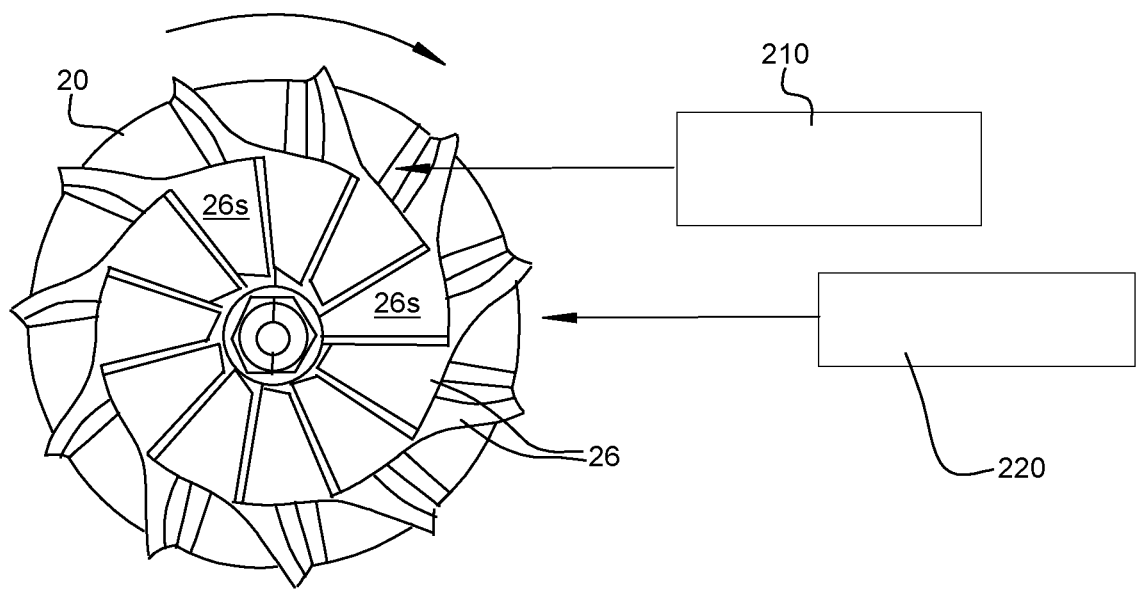
FIG. 15 is a diagrammatic top view of the shot peening machine in FIG. 14.

For shot peening hub, blade, and blade root fillet surfaces of compressor wheels in accordance with the invention, it is advantageous to employ two nozzles directing two streams of shot at two different locations and orientations toward the wheel, as shown diagrammatically in FIGS. 14 and 15. Calibration of the machine so that the desired intensity is achieved can be accomplished by using a test fixture 100 as shown in FIG. 12, holding two Almen N test strips 110 and 120 in orientations selected to mimic reasonably closely the orientations of the surfaces of the wheel to be peened. FIG. 13 depicts how the fixture 100 locates the two test strips 110 and 120 in key locations of the compressor wheel 20 (shown in phantom lines) onto which the two shot streams are to be directed. In the shot-peening operation, the compressor wheel is to be oriented with its center axis vertical and is to be rotated about its axis. Accordingly, the test fixture is rotatable about its center axis.

Prior to initiation of a shot-peening operation on a compressor wheel, calibration and validation of machine setup and process parameters can be accomplished by mounting the test fixture in the place where the compressor wheel will be mounted, and test strips can be peened to verify that the desired intensity is achieved. Once the parameters are validated, peening of compressor wheels can be performed.

Figure 16:
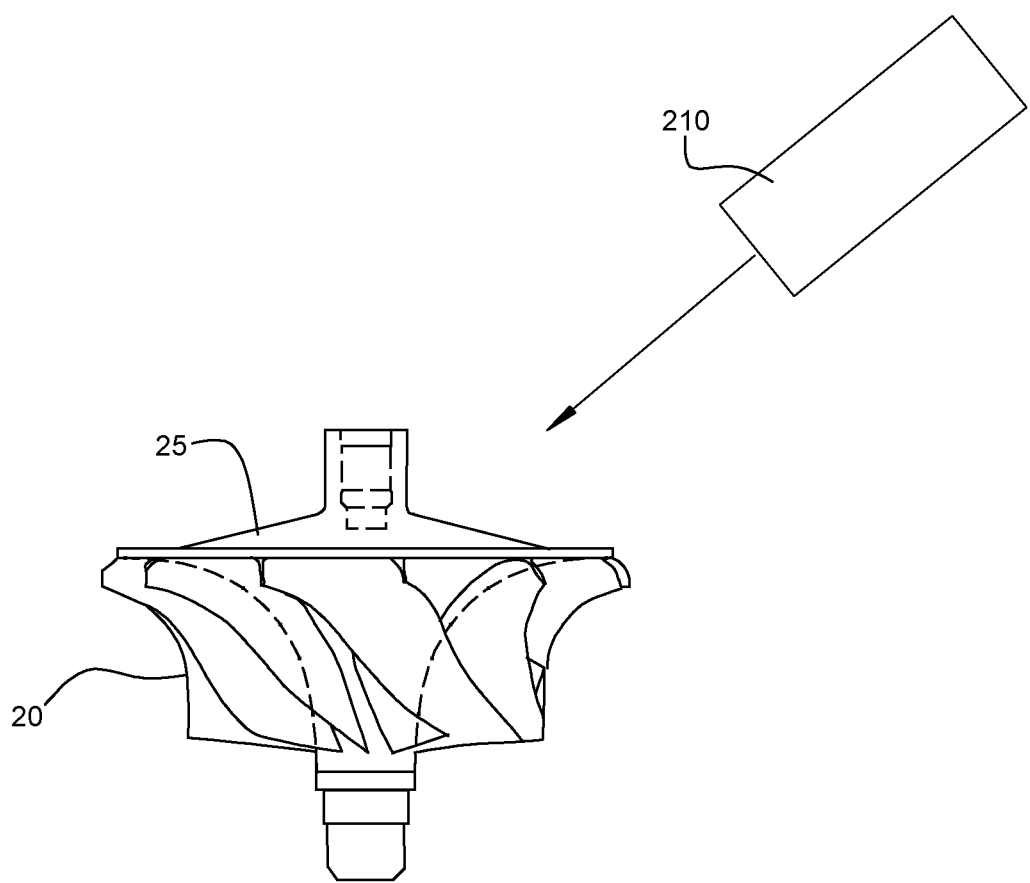
FIG. 16 is a diagrammatic side view of the shot peening machine configured for shot peening the back face of the compressor wheel.

FIGS. 14 and 15 illustrate the shot-peening machine arrangement for peening the blades and hub of the wheel. The arrangement includes a first nozzle 210 and a second nozzle 220 for directing two streams of shot media onto the compressor wheel 20. The streams are directed so as to impinge on both suction surfaces 26s and pressure surfaces 26p of the blades 26 as well as the hub line 24 and blade root fillets 28. FIG. 16 illustrates the arrangement for peening the back disk 25 of the wheel.

Figure 17:
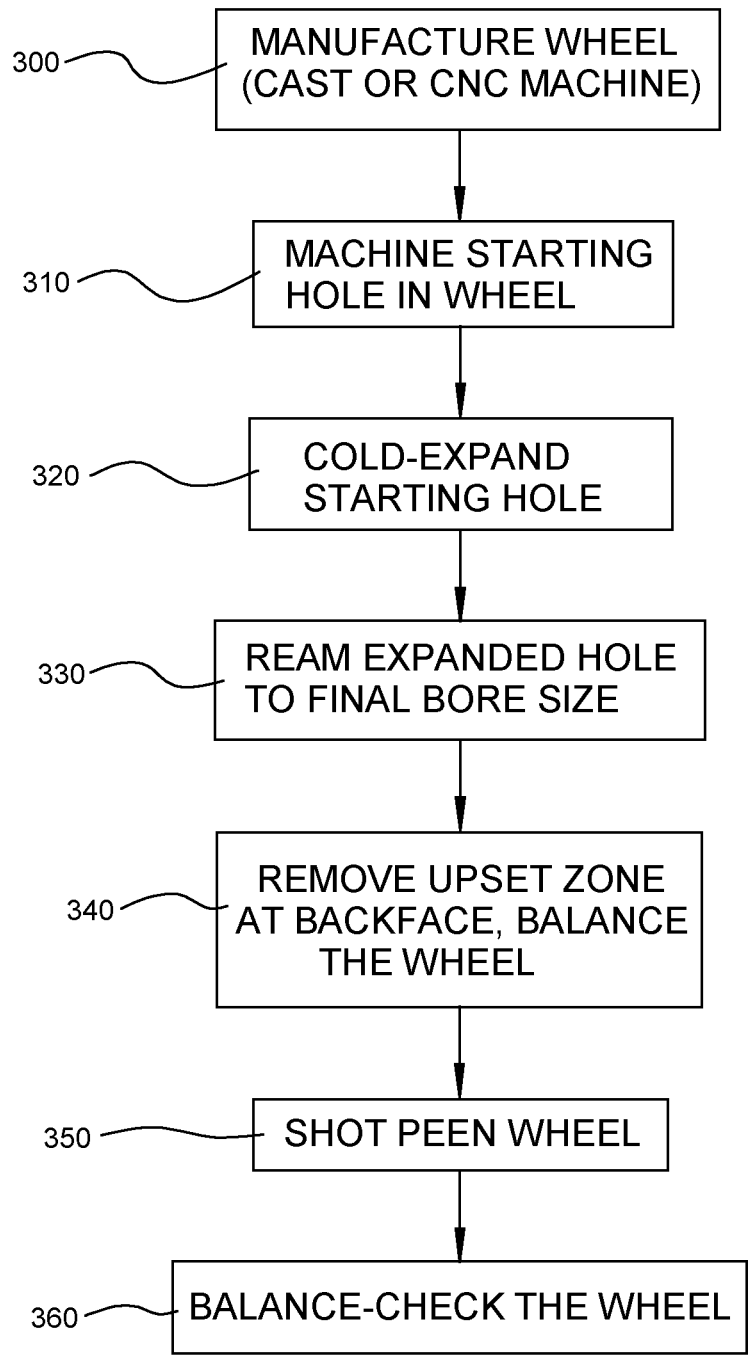
FIG. 17 is a flow chart showing the steps of a treatment process in accordance with an embodiment of the invention.

FIG. 17 is a flow chart of the treatment process in accordance with embodiments of the present invention. At step 300, a compressor wheel is manufactured of a suitable ductile metal such as aluminum alloy (non-limiting examples of which include grades 354, 355, and 2618). The wheel can either be machined by a CNC milling machine from a billet of the material, or can be cast by a suitable casting process. Next, at step 310, a starting hole is machined through the center of the wheel. If the wheel is to include a counterbore (as shown in FIG. 1, for example), the counterbore is bored into the nose end of the wheel. It should be noted, however, that the invention is not limited to processing of wheels having counterbores. The cold-expansion process can also be applied to a wheel lacking a counterbore, in which case the entire length of the bore is cold expanded in a manner substantially as described herein, the major diameter of the mandrel being started from outside the starting hole at the nose of the wheel.

At step 320, cold expansion of the starting hole is performed in accordance with the process parameters and characteristics herein described. Then at step 330, the cold-expanded bore is reamed to a precise inside diameter per wheel specifications, which also removes any artifacts such as an axial ridge caused by the cold-expansion operation, producing a desirably smooth surface finish on the inner surface of the bore. At step 340, the back face of the wheel adjacent the bore is skimmed to remove any surface upset caused by the cold expansion operation.

The wheel is then shot-peened, at step 350, in accordance with the process parameters and characteristics herein described. Finally, at step 360, the wheel is balance-checked.

Testing conducted by Applicant indicated that for significant improvement to LCF life, a minimum retained expansion of the bore should be imposed. Accordingly, for the purposes of the present invention, the cold expansion of the bore should achieve at least 1.2% retained expansion.

Persons skilled in the art, on the basis of the present disclosure, will recognize that modifications and other embodiments of the inventions described herein can be made without departing from the inventive concepts described herein. For example, although the cold expansion is described as being produced by a mandrel and split sleeve, the invention is not limited to the use of that specific type of tool, and other tool types may be used instead, such as a split mandrel that is expandable radially outwardly to expand the bore. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A process for producing a centrifugal compressor wheel, comprising the steps of:
   providing an as-manufactured centrifugal compressor wheel fabricated of a ductile metal having a tensile yield strength, the compressor wheel comprising a hub and a back disk, and a plurality of blades joined to the hub and the back disk, the plurality of blades defining an inducer portion of the compressor wheel configured for axial entrance of air into the compressor wheel and defining an exducer portion of the compressor wheel configured for radially outward discharge of air from the compressor wheel, each blade having a blade root fillet where the blade joins with the hub, the compressor wheel having a first face and an opposite second face, the compressor wheel defining a bore that extends centrally through the hub and the back disk along a downstream axial direction; and
   treating the as-manufactured compressor wheel by:
   (a) a bore treatment step comprising forcibly expanding a diameter of the bore, thereby cold working the metal at an inner surface of the bore beyond the tensile yield strength in a hoop-wise direction about the bore, so as to induce compressive residual hoop stresses in the metal adjacent the inner surface of the bore; and
   (b) a back disk treatment step comprising surface peening at least a portion of the back disk of the compressor wheel.

2. The process for producing a centrifugal compressor wheel of claim 1, wherein the bore treatment step is performed along only a fractional portion of the bore, the bore not being forcibly expanded outside said fractional portion.

3. The process for producing a centrifugal compressor wheel of claim 2, wherein a starting point of the fractional portion of the bore is spaced axially downstream from leading edges of the blade root fillets.

4. The process for producing a centrifugal compressor wheel of claim 1, further comprising surface peening at least some areas of the blades.

5. The process for producing a centrifugal compressor wheel of claim 4, wherein the areas of the blades that are surface peened include suction and pressure surfaces of the blades.

6. The process for producing a centrifugal compressor wheel of claim 5, further comprising surface peening the blade root fillets and the hub.

7. The process for producing a centrifugal compressor wheel of claim 6, wherein the surface peening is performed at an intensity from 0.15 mm to 0.6 mm as measured on the Almen N scale.

8. The process for producing a centrifugal compressor wheel of claim 6, wherein the surface peening is performed at an intensity from 0.2 mm to 0.35 mm as measured on the Almen N scale.

9. The process for producing a centrifugal compressor wheel of claim 6, wherein the surface peening is performed at an intensity from 0.25 mm to 0.35 mm as measured on the Almen N scale.

10. The process for producing a centrifugal compressor wheel of claim 1, wherein the bore treatment step comprises disposing a split sleeve that surrounds a mandrel within the bore, and drawing the mandrel axially through the split sleeve to expand the split sleeve radially outwardly.

11. The process for producing a centrifugal compressor wheel of claim 1, wherein the bore treatment step produces at least 1.2% retained expansion at the inner surface of the bore.

12. The process for producing a centrifugal compressor wheel of claim 1, further comprising the step of machining the inner surface of the bore to remove surface irregularities produced during the bore treatment step.

* * * * *